United States Patent [19]

Mathews

[11] 3,831,359
[45] Aug. 27, 1974

[54] BLADE ASSEMBLY FOR FLAIL MOWER

[76] Inventor: Bernard C. Mathews, Box 70, Crystal Lake, Crystal Lake, Ill. 60014

[22] Filed: July 30, 1973

[21] Appl. No.: 383,996

[52] U.S. Cl. .............................................. 56/294
[51] Int. Cl. .......................................... A01d 55/22
[58] Field of Search ................... 56/294, 249, 12.7

[56] References Cited
UNITED STATES PATENTS

| | | | |
|---|---|---|---|
| 3,177,640 | 4/1965 | Mott, Jr. | 56/294 |
| 3,604,188 | 9/1971 | Mott | 56/294 |
| 3,645,076 | 2/1922 | Aldred | 56/294 |
| 3,693,335 | 9/1972 | Mathews | 56/294 |

Primary Examiner—Russell R. Kinsey
Attorney, Agent, or Firm—Bayard Jones

[57] ABSTRACT

A blade assembly for a loop type blade mount of a flail rotor comprises two side slicer blades and a common supporting link. The link has a straight shank portion which is received in the loop type blade mount and removably secured therein by a clinch nut. It also has a curved portion which provides a partially closed loop on which the blades are mounted. The clearance between the free end of the curved portion and the mount surface is less than the blade thickness to prevent removal of either blade unless the link is first withdrawn from the blade mount. The side slicer blades are widest at the bend to provide a protruding edge which prevents grass stems from wedging in the crevice between the blade shanks.

3 Claims, 5 Drawing Figures

PATENTED AUG 27 1974　　　　　　　　　　　　3,831,359
Fig. 1.
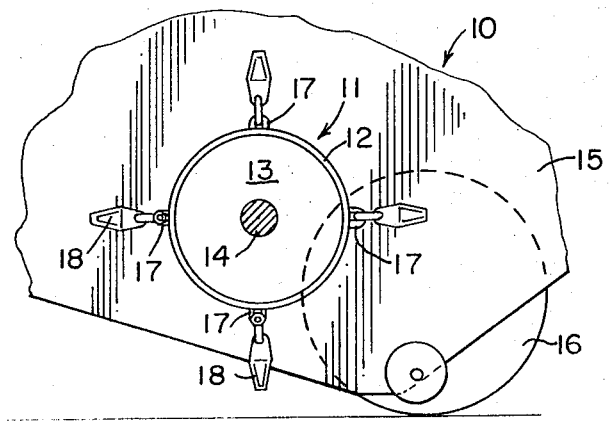
Fig. 2.
Fig. 3.
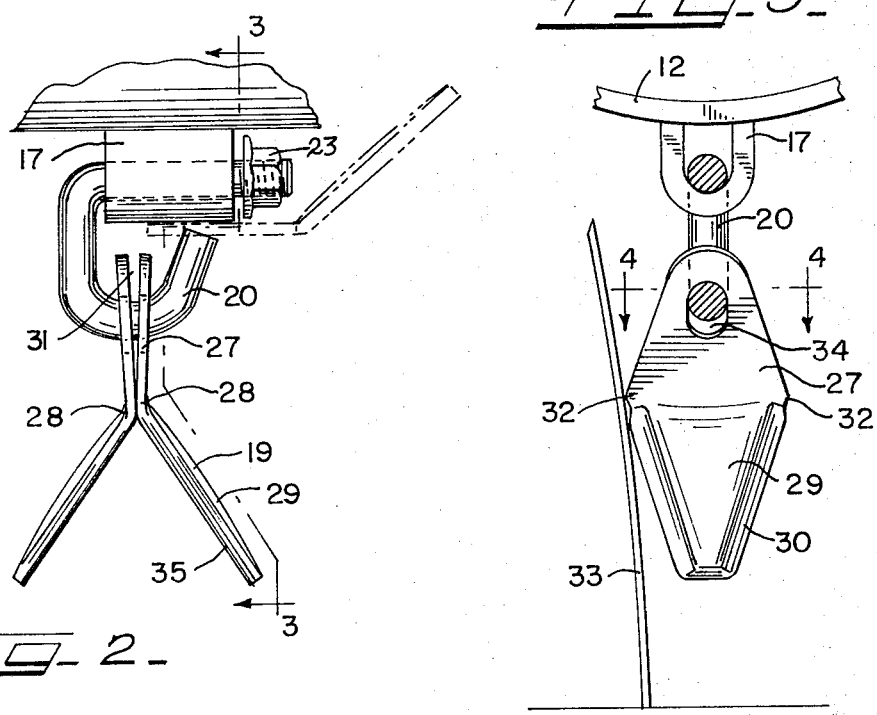
Fig. 4.
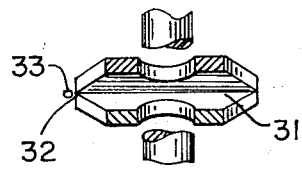
Fig. 5.
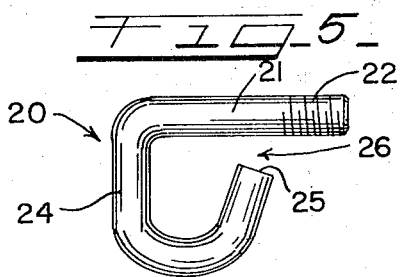

BLADE ASSEMBLY FOR FLAIL MOWER

This invention relates to a replaceable blade assembly for a flail rotor having loop type blade mounts.

My invention is particularly suitable for estate size lawn mowers of the type described in my copending application Ser. No. 216,413, filed Jan. 10, 1972, and U.S. Pat. No. 3,693,335, granted Sept. 26, 1972.

For such mowers, which have lightweight blades, a loop type of blade mount has proved to be very satisfactory and has the advantage of being an economically fabricated construction.

The present invention provides an assembly comprising two "side slicer" blades and a common supporting link. It is oftentimes necessary to replace a blade which has become damaged in use. My invention provides a construction in which an individual blade can easily be removed and replaced through a gap in the link, but when the assembly is operatively connected to the loop type blade mount, the structure of the blade mount blocks removal of the blade from the link.

The blade elements are arranged back to back and have bent lower portions constituting the cutting portions. The shank portions are disposed in a plane substantially perpendicular to the rotor axis with the bent portions extending away from said plane at an angle of from 30° to 50°. The edges of the bent portions are sharpened so as to provide the cutting edges, and preferably both the leading and trailing edges are cutting edges so that the blade pair can be reversed from front to back when the leading edges become dull, as is customary in the art.

One disadvantage of a link support for a two blade assembly is that the link does not prevent a separation of the blade shanks due to centrifugal force. Grass stems then become wedged in the V-shaped crevice between the blade shanks.

According to my invention, the blades are shaped so as to reduce the probability of grass clogging due to this wedging action. Thus, I am enabled to use a gapped link support without its attendant grass clogging disadvantage.

Other objects, features and advantages of my invention will become apparent as the description proceeds.

In the drawings:

FIG. 1 is a fragmentary sectional view of a flail mower showing the rotor and its blade assemblies;

FIG. 2 is a front elevation of a blade assembly embodying my invention;

FIG. 3 is a side section taken along line 3—3 of FIG. 2;

FIG. 4 is a plan section taken along line 4—4 of FIG. 3; and

FIG. 5 is an elevation of the link.

FIG. 1 shows a flail mower 10 which includes a rotor 11 having blade assemblies 18. The rotor 11 comprises a tubular member or drum 12 having at each end a closure disk 13. A stub shaft 14 at each end of the rotor is supported by the closure disks 13 whereby the rotor may be mounted between side plates 15. The mower is equipped with wheels 16.

The drum 12 has on its surface a plurality of loop type blade mounts arranged in four rows. Each blade mount is in the form of a U-shaped metal strip welded to the rotor surface.

Each blade assembly 18 comprises two blades 19 connected to each other and to the blade mount 17 by a link 20. The link comprises a straight shank portion 21 which is threaded at 22 to receive a nut 23, preferably a clinch nut which is a type of lock nut.

In addition to the shank portion, the link includes a curved portion 24 providing a partially closed loop, the free end 25 of the curved portion being spaced from the shank portion 21 to provide a gap 26. The gap 26 is wider than the thickness of either blade 19 so that the blades may be removably mounted on the curved portion 24.

Each blade 19 comprises an apertured (34) shank portion 27 and a cutting portion 29 connected by a bend 28 (FIG. 2). The edges of the cutting portion 29 are sharpened to provide cutting edges 30.

When the link 20 is received within the loop type blade mount 17, the clearance between the free end 25 and the surface of the blade mount is less than the thickness of the blade, thus preventing removal when the blade is swung up to its dotted-line position of FIG. 2. To replace a blade, the nut 23 is removed, the shank portion 21 slid out of the blade mount, and then one or both blades can easily be removed. The openings 34 are elongate to facilitate manipulation of the blade into position for removal.

The cutting portions 29 are disposed at an angle of from 135° to 150° from the shank portion 27, and preferably at an angle of 145°. When the rotor is stationary, the blades will hang from the link with their shanks in contact with each other. However, when the rotor is rotating at a high speed, centrifugal force will throw the cutting portions 29 outwardly and will force the bends 30 against each other. This will tend to cause the shank portions to become slightly separated, as shown in FIG. 2 in a somewhat exaggerated manner. This V-shaped crevice 31 would ordinarily tend to engage a stem of grass and cause that stem and successive stems to become wedged in the crevice.

By making the radius of the lower part of the link as small as possible, consistent with a loose mounting, the width of the crevice 31 can be maintained small, but it is not possible to eliminate the crevice entirely where the shank portions are comparatively short with respect to the blade length. In the embodiment shown, the bent portions are slightly longer than the shank portions to increase the cutting action.

According to my invention I taper the blade width in both directions away from the angle or bend. This provides at the leading edge of the blade assembly, a protruding edge portion 32 which, being right at the bend, is of substantial thickness and continuous. Thus a stem 33 of grass, as shown in FIGS. 3 and 4, will be engaged by the protruding portion 31 and knocked forwardly so that its upper end will not become wedged into the crevice 31 between the diverging shanks 27 or become hung up at the top of the shank. It has been found that this blade shape is quite free from grass hangups and clogging, as contrasted with the usual back-to-back two blade assembly.

The blade assembly is very easily removed from the blade mount to permit replacement or reversal of damaged cutting edges.

The term "loop type blade mount" as used herein designates any one of several configurations in which the loop is of appreciable length and is closed or substantially closed so that the insertion of the link shank into the loop must be an endwise insertion, the loop axis being parallel to the rotor axis.

Although only a preferred embodiment of my invention has been shown and described herein, it will be understood that various modifications and changes can be made in the construction shown without departing from the spirit of my invention, as pointed out in the appended claims.

I claim:

1. In a flail rotor for mowing machines comprising a rotor drum and a plurality of loop type blade mounts extending from the surface of said drum, a replaceable blade assembly comprising a link and two blades mounted on said link, each blade having an apertured shank portion and a cutting portion, said link having a straight shank adapted to be received within one of said loop type blade mounts with the free end of said link shank extending beyond same, means engaging said free shank end and confining said link shank within said blade mount, said link also having a curved portion providing a partially closed loop, the free end of said curved loop portion being spaced from the surface of said link shank to provide a gap, the width of said gap being greater than the thickness of the stock of said blade mount so that when said link shank is received within said blade mount, there will be a small clearance between said second mentioned free end and the surface of said blade mount, said clearance being less than the thickness of said blade to prevent removal thereof when in operative position, the thickness of said blade being less than the width of said gap to permit removal of said blade from said link when said gap is not blocked by said blade mount.

2. A replaceable blade assembly as claimed in claim 1 in which said blade cutting portions are disposed at an angle to said blade shank portions with said blades arranged back to back so that both cutting portions extend in opposite directions away from a plane perpendicular to the axis of said rotor, the bends in each blade being in contact with each other when said rotor is spinning, and said blade shank portion and cutting portion each being tapered in a direction away from said bends, the blade edges at said bends thus providing a protrusion along the leading edge of said blade assembly for deflecting grass stems away from said shank portions.

3. A replaceable blade assembly as claimed in claim 1 in which the end of said shank is threaded, and said confining means is a clinch nut.

* * * * *